United States Patent [19]

Allen

[11] Patent Number: 4,977,618
[45] Date of Patent: Dec. 11, 1990

[54] INFRARED DATA COMMUNICATIONS

[75] Inventor: Richard C. Allen, Los Gatos, Calif.

[73] Assignee: Photonics Corporation, Campbell, Calif.

[21] Appl. No.: 184,261

[22] Filed: Apr. 21, 1988

[51] Int. Cl.$^5$ .................... H04J 14/00; H04B 10/24; H04B 10/14

[52] U.S. Cl. ..................... 455/607; 370/1; 455/617

[58] Field of Search ............ 455/617, 603, 607; 370/1, 3, 4

[56] References Cited

U.S. PATENT DOCUMENTS

| | | | |
|---|---|---|---|
| 4,402,090 | 8/1983 | Gfeller | 455/607 |
| 4,540,605 | 9/1985 | Barone | 427/324 |
| 4,596,050 | 6/1986 | Rogers | 455/607 |
| 4,627,106 | 12/1986 | Drake | 455/617 |
| 4,723,314 | 2/1988 | Schneeberger | 455/617 |

FOREIGN PATENT DOCUMENTS

| | | | |
|---|---|---|---|
| 0103242 | 6/1983 | Japan | 455/617 |
| 0000235 | 1/1984 | Japan | 455/617 |
| 0079650 | 5/1984 | Japan | 455/617 |
| 0023427 | 1/1986 | Japan | 455/617 |

OTHER PUBLICATIONS

F. R. Gfeller and URS Bapst, Wireless In-House Data Communication Via Diffuse Infrared Radiation, pp. 1474–1486; Proceedings of the I.E.E.E.; vol. 67; No. 11; Nov. 1979.

F. Gfeller and E. Mumprecht, Minicomputer System Components Interconnected Via a Serial Infrared Link, IBM Technical Disclosure Bulletin, vol. 25, No. 8, Jan. 1983, pp. 4135–4137.

F. Gfeller, Infranet: Infrared Microbroadcasting Network for In-House Data, IBM Zurich Research Laboratory, 8803 Ruschlikon, Switzerland, pp. P27-1 to P27-4.

Touchpad Cable Function, IBM Technical Disclosure Bulletin, vol. 28, No. 9, Feb. 1986, pp. 4089–4090.

Group Encoding Method for Infrared Communication, IBM Disclosure Bulletin, vol. 28, No. 10, Mar. 1986, pp. 4440–4441.

Asynchronous Communication Link for Infrared Transmission, IBM Technical Disclosure Bulletin, vol. 28, No. 9, Feb. 1986, pp. 4083–4085.

Primary Examiner—Joseph A. Orsino
Assistant Examiner—L. Van Beek
Attorney, Agent, or Firm—Limbach, Limbach & Sutton

[57] ABSTRACT

The present invention is an apparatus for wireless communications of information between two locations. A transmitter means modulates the information into infrared radiation at a first location. The infrared radiation is transmitted by the transmitter to a reflecting surface along a straight line path which is transparent to the infrared radiation. The infrared radiation is reflected at the reflecting surface forming reflected infrared radiation. A receiver means for receiving the reflected infrared radiation from the reflecting surface is positioned at a second location. The second location and the reflecting surface have a straight line path therebetween which is transparent to the infrared radiation.

23 Claims, 3 Drawing Sheets

INFRARED DATA COMMUNICATIONS

FIELD OF THE INVENTION

This invention relates to the field of data communications. More particularly, this invention relates to an apparatus for wireless data communication between machines such as computers in a local area network which utilizes infrared radiation as the communications medium.

BACKGROUND OF THE INVENTION

Data communications between personal computers, computer terminals and peripheral equipment is desired for many business computing applications. A common application for data communications is a local area network. In a typical local area network, data communication is carried out over a hard wired media, usually using coaxial or twisted pair cable. Staffing facility or assignment changes require re-routing these data communication cables which is costly in both manpower and downtime for rewiring. Similar requirements apply to applications which link computers with computer terminals.

Infrared optical energy has been used for data communications. Earlier uses of optical energy for communication were restricted either to point-to-point or multipoint communication links or spatially diffuse transmission of infrared power to wide field of view receptors employing either direct or diffusely reflected optical paths. Point-to-point or multipoint communication lengths require either fiber optic cable or direct free-space aimed transmission. Fiber optic cable communications networks require consultants with specialized cabling skills and present the same system re-routing difficulties as the hard wired communications systems described above. Direct free-space aimed transmissions require a straight line path between a transmitter and receiver which is transparent to the communications media. An example of such a direct free space aimed transmission is remote control of a home television receiver. The remote control unit must be aimed at the receiver of the television in order to activate any kind of control.

Spatially diffuse optical systems using infrared radiation have been disclosed by Gfeller and Bapst of IBM in their "Wireless In-House Data Communication Via Diffused Infrared Radiation", proceedings of the IEEE, Vol. 67, No. 11, November 1979. This system requires that the communications area be flooded with radiation containing communicated information which requires large amounts of power to achieve reliable communications at high speeds. Furthermore, this system does not permit simultaneous co-existence of more than one independently operating communications network in the same frequency range of radiation.

FIG. 1 shows a schematic representation of the system suggested by Gfeller and Bapst. The communications area 100 contains four computer terminals 102, 104, 106 and 108 and a satellite transponder 110. Each of the terminals 102 through 108 is equipped with an infrared transceiver having a transmitter and a receiver. The satellite transponder 110 is also equipped with an infrared transmitter and receiver. The satellite transponder 110 is hard wire coupled to a controller 112. The controller is hard wire coupled to a host computer 114. As depicted in FIG. 1, the satellite transponder floods the communications area 100 with infrared radiation 116.

The terminal 102 is configured in the receive mode. Any infrared radiation 116 impinging into the wide field of view represented by cone 118 is sensed by the terminal 102. Terminal 106 is shown in transmit mode. The infrared radiation 120 is transmitted by terminal 106 into the room 100. The satellite transponder 110 senses the infrared radiation 120 transmitted by terminal 106. For terminal 106 to communicate with another terminal 102 in the room, the satellite transponder must receive the communication from terminal 106 through infrared radiation 120 as shown and flood the room with infrared radiation 116 in order for terminal 102 to receive the infrared radiation within its field of view 118.

The satellite transponder as described above must be hard wired into a controller 112. The controller 112 is controlled by a host computer 114. For multiple communications networks to coexist within a single communications area 100, the terminal transceivers and their associated satellite transponder for each separate network must operate at a different frequency requiring specialized hardware for each network.

Other wireless communications systems employ radio frequency signals conducted by power lines or by free space transmission. Power line conductive signals are prone to unpredictable range and high error rates due to noise caused by other equipment attached to the power line. Free space radio based systems are subject to wide variations in signal strength due to multi-path reflections. Radio based systems are subject to interference. Information transmitted on a radio based system can be detected from a source external to the communications area. Further, radio based services are subject to government regulation.

Wireless data communication is desirable to avoid the expense and loss of productivity associated with wiring and rewiring of communication paths. A wireless data communications link is needed which overcomes the problems of flooding the communications area with radiation, wiring of transponders and radio signal communications.

SUMMARY OF THE INVENTION

The present invention is an apparatus for wireless communications of information between two locations. A transmitter means modulates and transforms the information into infrared radiation at a first location. The infrared radiation is transmitted by the transmitter to a reflecting surface along a straight line path which is transparent to the infrared radiation. The infrared radiation is reflected at the reflecting surface forming reflected infrared radiation. A receiver means for receiving the reflected infrared radiation from the reflecting surface is positioned at a second location. The second location and the reflecting surface have a straight line path therebetween which is transparent to the infrared radiation.

DETAILED DESCRIPTION OF THE PREFERRED EMBODIMENT

Figure 2:
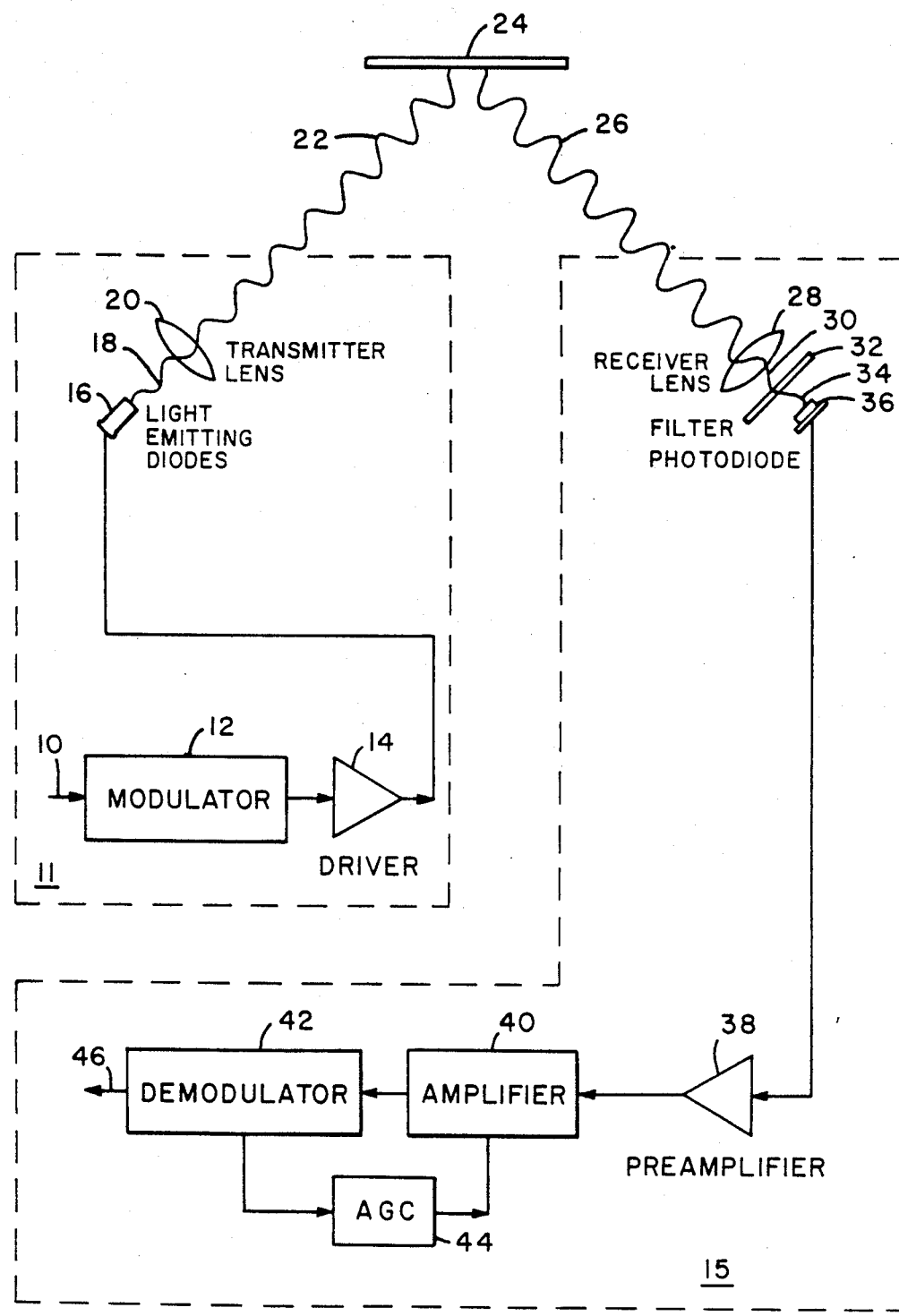
FIG. 2 shows a block diagram of a preferred embodiment of the present invention.

FIG. 2 shows a block diagram of the preferred embodiment of the present invention. This embodiment has a transmitter block 11 and receiver block 15. Ordinarily, this invention utilizes a transceiver located with each infrared communications node where each transceiver has a transmitter block and a receiver block. There may be applications where an element of a communications network utilizing the present invention may consist solely of a receiver or a transmitter.

The circuit shown in the block diagram of FIG. 2 has an input 10 for receiving an electronic signal representing information or data. The input 10 is coupled to transfer the signal to a modulator unit 12. A modulator is used when the electronic signal which is applied to input 10 is a binary signal of the type used in digital computers. The modulator 12 transforms the signal into coded pulses. Where the present invention is used with an application which does not utilize binary data the modulator 12 may be changed, deleted or bypassed to allow transmission of information in other forms by coded pulse mean.

The modulator 12 is coupled to a driver 14. The driver 14 increases the current driving capability of the modulated signal. The output of the driver is applied to one or more light emitting diodes 16. The light emitting diodes 16 receive the modulated signal having increased drive from the driver and forms an infrared radiation signal representative of the information applied to input 10.

The infrared signal 18 is focused by the transmitter lens 20. The focused infrared signal 22 is directed toward a diffuse reflecting surface 24. The diffuse reflecting surface 24 reflects the transmitted and focused infrared signal 22 in all directions. Only that portion of the reflected infrared signal 26 which illuminates the receiver lens 28 is shown in FIG. 2. Some amount of dispersion of the transmitted infrared signal 22 occurs. The reflected infrared signal 26 radiates in all directions. The infrared signal 26 which strikes the receiver lens 28 is focused into radiation 30.

The focused radiation 30 also includes extraneous infrared radiation and radiation from other portions of the spectrum. The filter 32 filters out all but infrared radiation in the desired frequency portion of the spectrum.

The filtered infrared radiation 34 impinges on photodiode 36. Photodiode 36 senses the impinging radiation 34 and forms an electronic signal representative of the infrared radiation. The electronic signal formed by the infrared radiation striking the photodiode 36 represents the information contained in the electronic signal applied to input 10 of the circuit. The photodiode 36 is coupled to a preamplifier circuit 38.

The preamplifier circuit 38 increases the amplitude of the electronic signal from photodiode 36. The preamplifier circuit 38 is coupled to the amplifier circuit 40. The amplifier circuit is coupled to a demodulator 42. The demodulator transforms the signal it receives from amplifier 40 back into a binary signal which it applies to output 46. The demodulator is also coupled to automatic gain control (AGC) circuit 44 which is coupled to control the amplifier 40.

Figure 3:
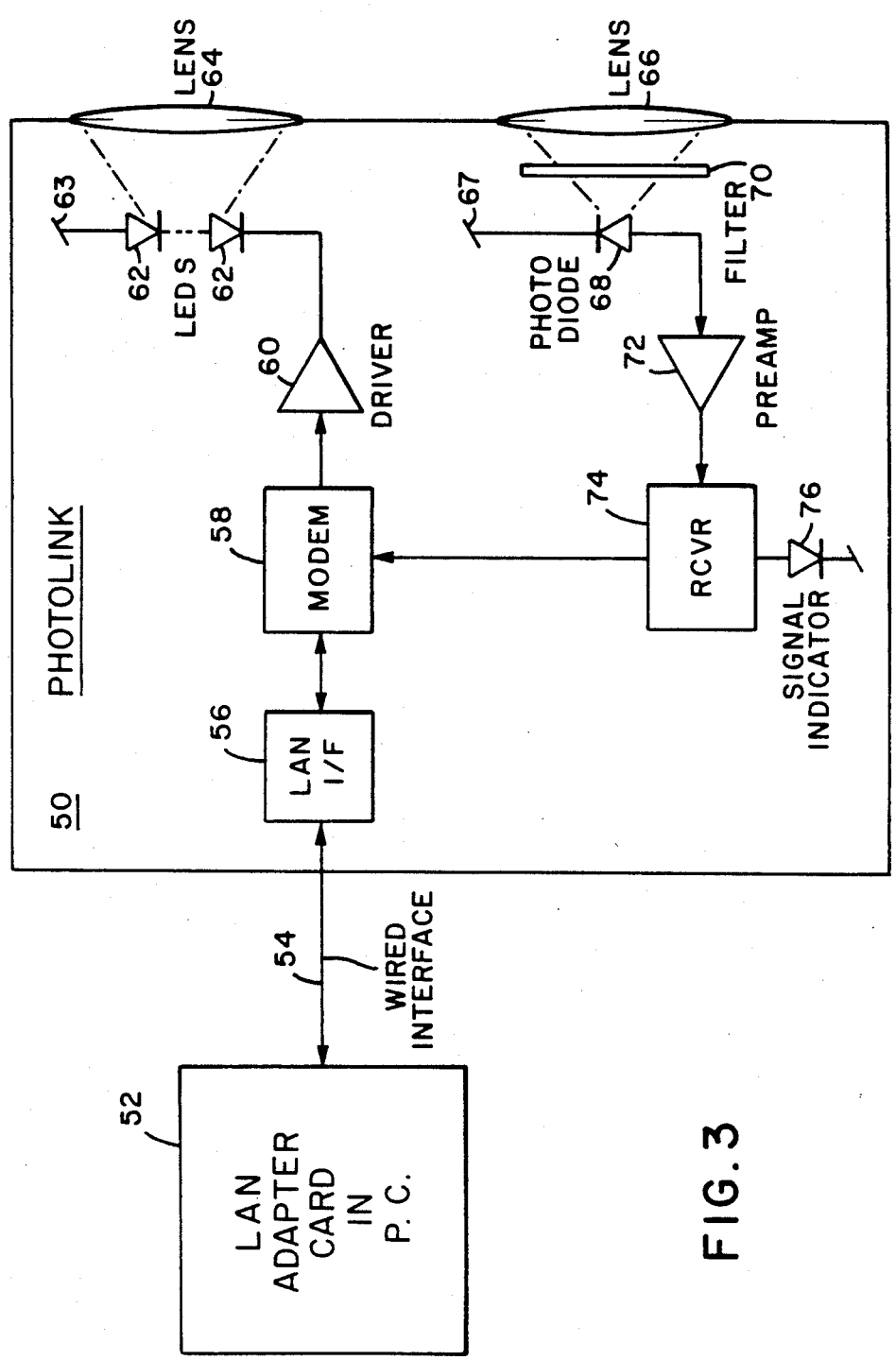
FIG. 3 shows a more detailed block diagram of the preferred embodiment of the present invention.

FIG. 3 shows a more detailed block diagram of the preferred embodiment. This embodiment shows an infrared transceiver 50 which is coupled to a local area network adapter card in a personal computer 52. The infrared transceiver 50 is coupled to the personal computer 52 as if it were merely conventional local area network wire. The wire interface 54 is a connector between the infrared transceiver and the local area network adapter card in the personal computer. Within the infrared transceiver is a local area network interface 56 which is coupled to receive electronic signals from or transfer electronic signals to the local area network adapter card 52. The local area network interface 56 is coupled to apply the electronic signal from the local area network interface 56 to a modem 58.

Figure 1:
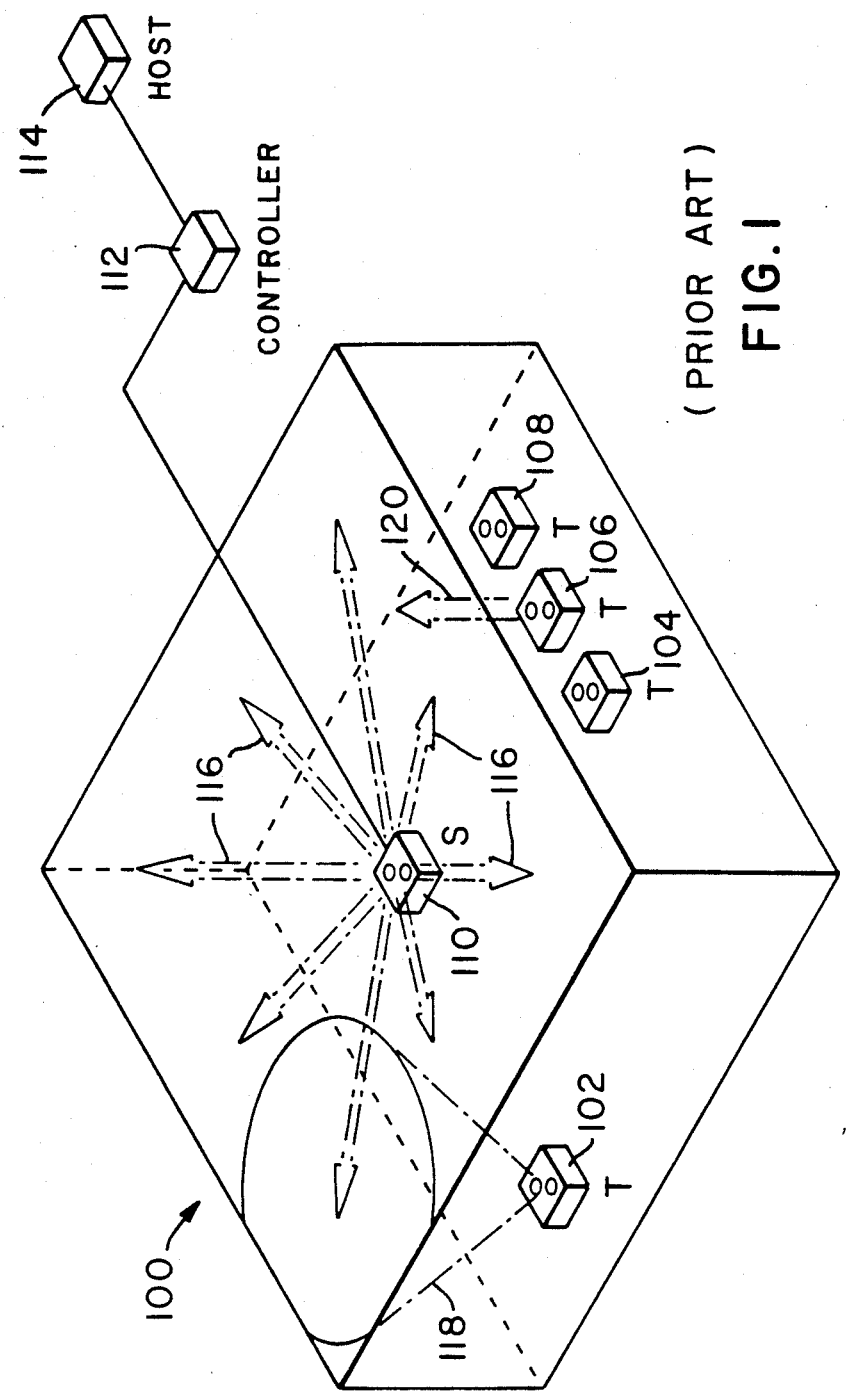
FIG. 1 shows a schematic representation of a prior art embodiment.

In the transmit mode, the modem 58 operates the same as the modulator 12 of FIG. 1. After the modem 58 has modulated the signal received from the local area network adapter card, the modulated signal is applied to driver 60 which increases the drive of the modulated signal to a level sufficient to activate the Light Emitting Diodes (LEDs) 62. The LEDs 62 are coupled between the driver and a power supply voltage. Appropriate modulation at a correct driver level will cause the LEDs 62 to emit infrared radiation as is well known. The LEDs 62 used in this application are particularly suited for producing infrared radiation. The radiation is emitted from the LEDs 62 and focused by lens 64.

In the receive mode, infrared radiation is received by the receive lens 66. Lens 66 focuses the received radiation onto photodiode 68. In certain applications, lenses 64 and 66 may be replaced with other optical focusing devices such as a parabolic mirror. Filter 70 eliminates radiation outside of the portion of the spectrum of interest. Only those frequencies of infrared radiation in the range expected from LEDs 62 are passed by filter 70. The photodiode 68 responds to radiation impinging thereon and produces an electronic signal. The photodiode 68 is coupled between a supply voltage and a preamplifier 72. The electronic signal formed by the photodiode 68 is applied to the preamplifier 72 to be amplified. The amplified signal from the preamplifier 72 is coupled to the receiver 74.

The receiver 74 is coupled to the modem 58. The modem 58 demodulates the signal received by the receiver portion of the infrared transceiver 50. The signal demodulated by the modem 58 is coupled to the local area network interface 56. The local area network interface 56 then couples the received information through the wired interface into the local area network adapter card 52 in the personal computer.

A network utilizing the present invention may incorporate, or be incorporated into, a conventional hard wired network. For example, a STARLAN hub may have several personal computers coupled into the network over a hard-wired interface and several other personal computers coupled into the network using infrared communication. A plurality of transceivers according to the present invention merely replace the wiring between a like number of nodes in a conventional network.

In a network only using the present invention for communication there is no central point for failure. If one machine in the network fails the remainder of the network need not be affected as may happen in a hard-wired network.

The reflecting surface utilized in accordance with the preferred embodiment of the present invention is a diffuse reflecting surface. All transceivers in a given network are oriented to transmit or receive infrared radiation to or from a common region on the diffuse reflecting surface.

By utilizing a diffuse reflecting surface in the preferred embodiment of the present invention, any receiver with unobstructed line of sight to the said common region on the diffuse reflecting surface will receive reflected infrared radiation from any transmitter in the network which is illuminating said common region with infrared radiation. This is because the diffuse reflector reflects radiation in all directions unlike the single path reflecting surface such as found in a common mirror.

Conventional acoustical ceiling tiles, plastered ceilings, plasterboard and wood ceilings are very good diffuse reflecting surface for infrared radiation. Thus, in almost every business having an open office environment no installation is required other than connecting the infrared transceiver into the local area network connector found on the back of an appropriately configured personal computer.

Each user desiring to be a member of a particular local area network utilizing the present invention need merely aim their infrared transceiver at the selected location on the ceiling to be connected to that network. Unlike prior art infrared networks which, flood the entire volume of space with infrared radiation, a network utilized in the present invention, only requires a small spot on an acoustical tile ceiling, usually less than 10 feet square, for forming the network link. Accordingly, multiple local area networks may be located within a single open office environment room using identical infrared transceiver equipment simply by selecting a different spot on the ceiling on which to focus the transceivers of the second infrared network.

The transmitting lenses help to direct the infrared radiation at the appropriate spot on the ceiling. The receiving optical lens focuses the received light onto the photodiode. These lenses narrow the field of view of the transceivers and thereby reduces ceiling area illuminated by the infrared radiation which further excludes extraneous light sources. The filter is designed to pass radiation only in the desired frequency range expected from an infrared transmitter utilized in the communication network. The narrow field of view of the transceivers operating in conjunction with the filter excluding unwanted extraneous radiation increases the signal-to-noise ratio of the transmission of data which allows for increased data rates.

An improved information communication system has been disclosed for communicating data without the use of wires. The data communication system communicates via infrared radiation. Although the invention has been disclosed in accordance with a preferred embodiment, changes and modifications which become apparent to one skilled in the art after reading this specification are deemed within the spirit and scope of this invention.

What is claimed is:

1. An apparatus for transmitting information between components in a communication network within an enclosure having preexisting infrared reflecting characteristics comprising:
   a. a plurality of transceivers, each having transmitter means for transmitting information modulated into infrared radiation, receiver means for receiving the infrared radiation, and focusing means for focusing the transmitter means and receiver means onto a target area; and
   b. means for positioning the plurality of transceiver means at different locations in said enclosure with the focusing means of the plurality of the transceiver means focused onto the same target area which comprises a small spot of an inner surface of the enclosure which is not modified to alter its infrared reflective characteristics so that more than one network can operate within the enclosure and noise sources within the enclosure can be omitted from the target area.

2. The apparatus according to claim 1 wherein the entire target area is not modified to substantially alter the infrared reflective characteristics.

3. The apparatus according to claim 1 wherein said first transmitter means further comprises:
   a. one or more infrared LEDs for forming an infrared radiation signal; and
   b. a transmitter lens for passing and focusing said infrared radiation.

4. The apparatus according to claim 1 wherein said first receiver means further comprises:
   a. a receiver lens for passing and focusing said infrared radiation; and
   b. an infrared receptor for transforming said infrared radiation into an electronic signal.

5. The apparatus according to claim 4 wherein said receptor comprises a PIN diode.

6. The apparatus according to claim 5 wherein the diffuse reflecting surface comprises an acoustical ceiling tile.

7. The apparatus according to claim 1 further comprising a second receiver means positioned at said first location and a second transmitter means positioned at said second location wherein said first transmitter means and said second receiver means are combined into a first transceiver means and said second transmitter and said first receiver are combined into a second transceiver means.

8. The apparatus according to claim 7 wherein each said first transceiver means and said second transceiver each direct infrared radiation to or receives infrared radiation from a position which is approximately the same location on the reflecting surface.

9. The apparatus according to claim 1 wherein the plurality of transceivers is divided into first and second groups with the focusing means of one group focused on a first common area of the inner surface of the enclosure and the focusing means of the other group focused on a second common area of the interior of the enclosure where said enclosure has an unmodified diffusing surface.

10. A communication network for interconnecting a plurality of pieces of computer equipment including computers, computer terminals, printers, and computer peripherals to communicate an electronic signal representing information between said pieces of computer equipment where said network is located within an enclosure, comprising:
   a. a diffuse reflecting surface which is not modified to alter its infrared reflective characteristics formed on a small portion of an inner surface of the enclosure for receiving infrared radiation impinging thereon and for reflecting infrared radiation therefrom;
   b. a plurality of modulators, a first of said modulators being coupled to a first piece of computer equipment, for modulating a first electronic signal representing information received from said first piece of computer equipment to produce a first modulated electronic signal;
c. a plurality of infrared transmitters, a first of said transmitters being coupled to said first modulator for transforming said first modulated electronic signal into an infrared radiation signal, each of said transmitters having a path transparent to said infrared radiation signal to said reflecting surface where said infrared radiation is diffusely reflected and being focused on the diffuse reflecting surface;
d. a plurality of infrared receivers having a line of sight path from said surface, said receivers being focused to receive the infrared radiation reflected from the diffuse reflecting surface and for forming a second modulated electronic signal;
e. a plurality of demodulators, each of said demodulators coupled to each of said infrared receivers and also coupled to each of said computers, each of said demodulators for receiving said second modulated electronic signal and for demodulating it to form a second electronic signal representing said information; and
f. means for transmitting said second electronic signal to a second piece of computer equipment.

11. The communication medium according to claim 10 wherein each infrared receiver further comprises a lens for focusing said infrared radiation which is reflected.

12. The communication medium according to claim 11 wherein each infrared receiver further comprises a filter for excluding unwanted radiation.

13. The communication medium according to claim 10 wherein each infrared transmitter further comprises a lens for focusing said infrared radiation signal.

14. The apparatus according to claim 10 wherein the plurality of transceivers is divided into first and second groups with the focusing means of the first group focused on said same small portion of the inner surface of the enclosure and the focusing means of the second group focused on a different small portion of the inner surface of the enclosure where said enclosure has an unmodified diffusing surface.

15. A method for transmitting information from a first location to a second location, each of said first location and said second location being within an enclosure comprising:
a. transmitting information modulated into infrared radiation by directing it from said first location directly to a diffuse reflecting surface which is not modified to alter its infrared reflective characteristics positioned at a third location on a small portion of an inner surface of said enclosure along a first straight line path therebetween which is transparent to the infrared radiation; and
b. receiving the infrared radiation at said second location from said reflecting surface along a second straight line path therebetween which is transparent to the infrared radiation by focusing the receiver on the reflecting surface.

16. The method according to claim 15 wherein the step of receiving further comprises:
a. passing and focusing said infrared radiation through a second lens; and
b. transforming said infrared radiation into an electronic signal using an infrared receptor.

17. The method according to claim 16 wherein said receptor comprises a PIN diode.

18. The method according to claim 15 wherein the diffuse reflecting surface comprises a member of the group consisting of an acoustical ceiling tile, plaster, plasterboard or wood.

19. The method according to claim 15 wherein the step of transmitting further comprises:
a. activating one or more infrared LEDs for forming an infrared radiation signal; and
b. passing and focusing said infrared radiation through a first lens.

20. The apparatus according to claim 15 wherein the plurality of transceivers is divided into first and second groups with the focusing means of the first group focused on said same small portion of the inner surface of the enclosure and the focusing means of the second group focused on a different small portion of the inner surface of the enclosure where said enclosure has an unmodified diffusing surface.

21. A method for interconnecting a plurality of pieces of computer equipment including computers, computer terminals, printers and computer peripherals to communicate an electronic signal representing information between said pieces of computer equipment where the pieces of computer equipment are operating within an enclosure, comprising:
a. receiving a first electronic signal from a first piece of computer equipment;
b. modulating said first electronic signal to form a first modulated signal;
c. transforming said first modulated signal into a first infrared radiation signal;
d. focusing said first infrared radiation signal on a diffuse reflecting surface formed on a small portion of an inner surface of the enclosure which is not modified to alter its infrared reflective characteristics;
e. reflecting said first infrared signal from said diffuse reflecting surface forming a reflected infrared radiation signal;
f. focusing said reflected infrared radiation signal onto a receptor forming a focused reflected infrared radiation signal;
g. transforming said focused reflected infrared radiation signal into a second modulated signal;
h. demodulating said second modulated signal into a second electronic signal; and
i. transmitting said second electronic signal to a second piece of computer equipment.

22. The apparatus according to claim 21 wherein the plurality of transceivers is divided into first and second groups with the focusing means of the first group focused on said same small portion of the inner surface of the enclosure and the focusing means of the second group focused on a different small portion of the inner surface of the enclosure where said enclosure has an unmodified diffusing surface.

23. An apparatus for transmitting information between components of a local area network within an enclosure having preexisting infrared reflecting characteristics comprising:
a. a plurality of transceivers, each having transmitter means for transmitting information modulated into infrared radiation, receiver means for receiving the infrared radiation, and focusing means for focusing the transmitter means and receiver means onto a projection area of an inner surface of the enclosure; and b. means for positioning the plurality of transceiver means at different locations in said enclosure with the focusing means of the plurality of the transceiver means focused onto the same portion of the inner surface of the enclosure forming a target area including all of each projection area comprising of an inner surface of the enclosure for which the target area, as a whole, is not modified to alter its infrared reflective characteristics.

* * * * *